United States Patent [19]

MacLennan

[11] Patent Number: 5,088,371
[45] Date of Patent: Feb. 18, 1992

[54] SAW TOOTH AND HOLDER

[76] Inventor: Charles D. MacLennan, 153 Cote St-Charles, Hudson Heights, Quebec, Canada, J0P 1J0

[21] Appl. No.: 727,188

[22] Filed: Jul. 9, 1991

Related U.S. Application Data

[60] Division of Ser. No. 578,165, Sep. 6, 1990, which is a continuation-in-part of Ser. No. 469,853, Jan. 23, 1990, abandoned.

[51] Int. Cl.⁵ .............................................. B27B 33/08
[52] U.S. Cl. .................................... 83/840; 83/839
[58] Field of Search ................. 83/835, 838, 839, 840, 83/841, 842, 843, 844, 845

[56] References Cited

U.S. PATENT DOCUMENTS

| | | |
|---|---|---|
| 657,873 | 9/1900 | Jewett ................................... 83/840 |
| 2,160,525 | 5/1939 | Thornton . |
| 2,736,352 | 2/1956 | Wright . |
| 2,958,348 | 11/1960 | Bueneman ............................. 83/838 |
| 3,261,384 | 7/1966 | Henderson . |
| 3,358,720 | 12/1967 | Henderson . |
| 3,945,289 | 3/1976 | Baez Rioz . |
| 3,977,447 | 8/1976 | Pease . |
| 3,986,421 | 10/1976 | Schultz . |
| 4,084,470 | 4/1978 | Reed . |
| 4,563,929 | 1/1986 | Ringlee et al. . |
| 4,744,278 | 5/1988 | Wright . |
| 4,750,396 | 6/1988 | Gaddis et al. . |
| 4,765,217 | 8/1988 | Ludwig . |
| 4,879,936 | 11/1989 | Anderson . |
| 4,932,447 | 6/1990 | Morlin . |
| 4,967,630 | 11/1990 | Burke ................................... 83/838 |

FOREIGN PATENT DOCUMENTS 57201121 3/1988 Japan .

Primary Examiner—Frank T. Yost
Assistant Examiner—Scott A. Smith
Attorney, Agent, or Firm—Diller, Ramik, & Wight

[57] ABSTRACT

A circular saw is provided with a disc and tooth holders mounted on the periphery of the disc, with each tooth holder having a pair of legs straddling the disc and fasteners such as bolts and nuts extending through the legs and discs for fastening the holder to the disc. A tooth head is provided with a shank in the form of a bolt which extends through a bore in the holder engaging the tooth head, and the shank and tooth head extend in a tangential axis with the periphery of the disc. Shoulders are provided on the body of the holder for abutting the tooth head.

5 Claims, 2 Drawing Sheets

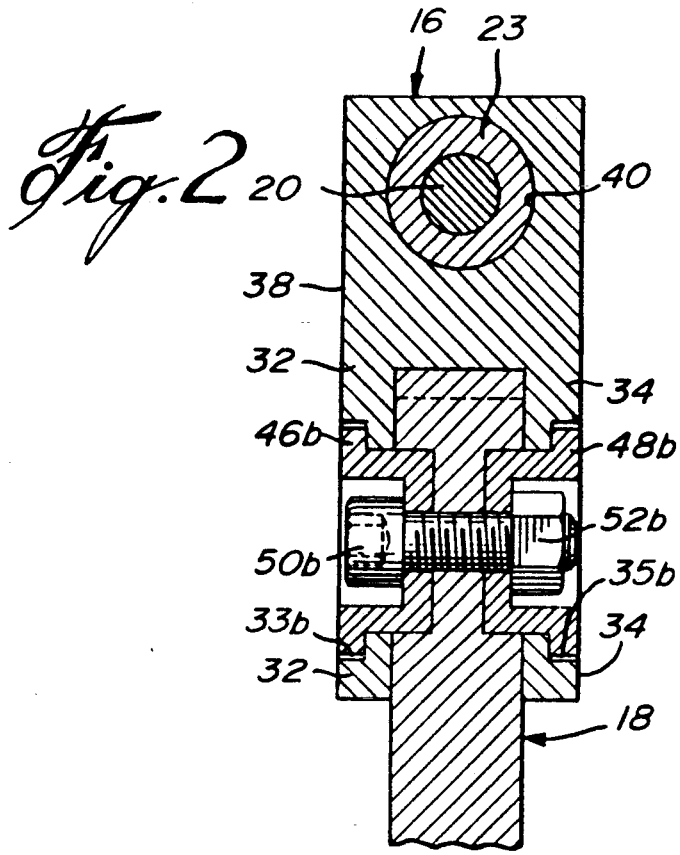
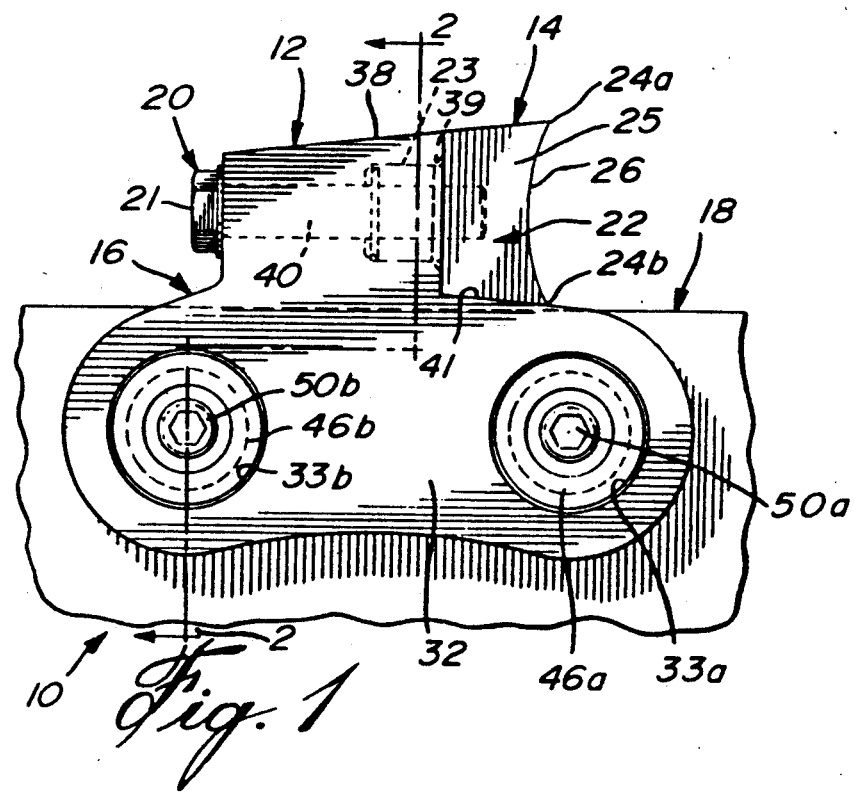

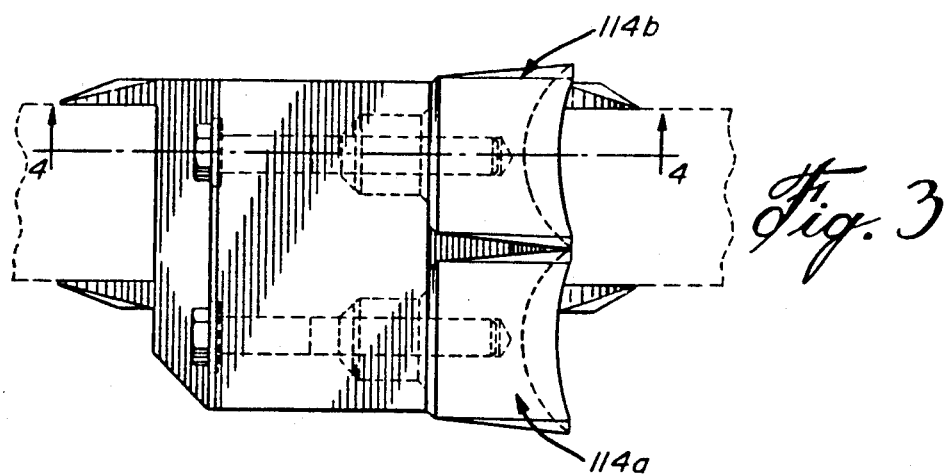
Fig. 3
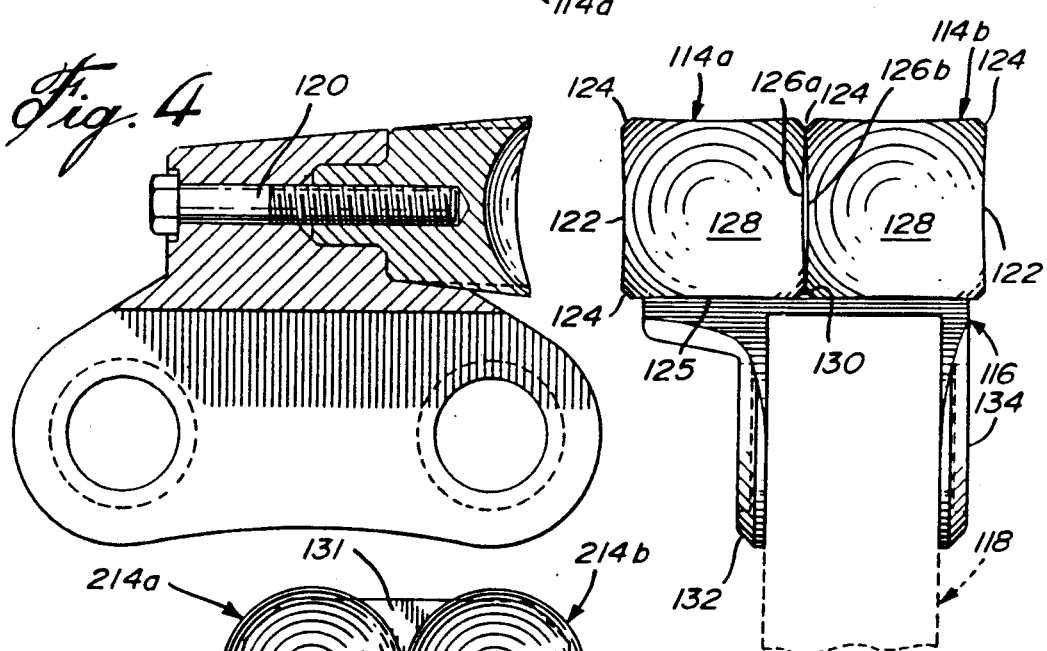
Fig. 4
Fig. 5
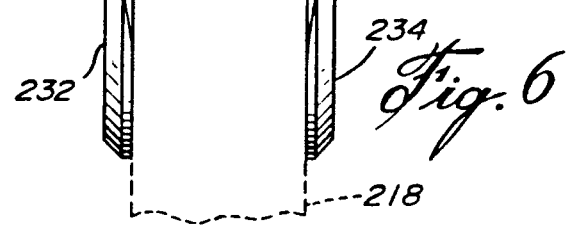
Fig. 6

SAW TOOTH AND HOLDER

CROSS REFERENCE TO RELATED APPLICATION

This application is a division of application Ser. No. 07/578,165, filed Sep. 6, 1990 now pending which is a continuation-in-part application of 07/469,853 filed Jan. 23, 1990, now abandoned.

BACKGROUND OF THE INVENTION

1. Field of the Invention

The present invention relates to wood cutting saws, and more particularly, to a saw tooth insert and the means for mounting it to a saw.

2. Description of the Prior Art

It is now common to use circular saws on feller buncher heads, for severing the trunk of a tree to be felled Since the circular saw is made to rotate in a horizontal plane near the ground, when the feller buncher head is in an operative position, it is not surprising that the teeth inserts on the periphery of the circular saw may be subject to severe shocks. In such situations, it is desirable to minimize the damage to the circular saw. It would be preferable to contain the damage to one or only a few teeth which could then be easily replaced.

Most prior art circular saws include a circular disc with radial inserts mounted in gullets cut out in the discs. Thus, in the event that a tooth bit should strike an immovable object, such as a boulder, it is conceivable that the tooth and bit would be destroyed with the possibility of damage to the disc as well. The loads would, in most cases, be transmitted through the tooth shank sitting radially in the gullet, and thus to the disc. It is evident that such loads would be applied tangentially to the saw disc against the radially extending shanks. C-shaped teeth would also be faced with similar stresses causing probable damage to the disc.

SUMMARY OF THE INVENTION

It is an aim of the present invention to provide an improved replaceable saw tooth with a novel tooth holder for mounting the tooth on the substrate of the saw.

It is a further aim of the present invention to provide an improved circular saw with replaceable saw teeth on the periphery thereof mounted in such a way that gullets are not required in the circular saw disc.

It is a further aim of the present invention to provide an improved saw tooth insert and holder whereby the tooth insert may be rotated to extend the life thereof.

A construction in accordance with the present invention comprises a saw tooth and tooth holder combination for a cutting saw. The saw includes a substrate, and the tooth holder is formed as a clevis which straddles the substrate, each clevis holder including a U-shaped member having a pair of legs extending on either side of the substrate and having a body portion formed at the bight of the U-shaped member straddling the substrate. The body defines a bore, and the saw tooth includes a tooth head having a small end and divergent surfaces extending to a large end with a concave recess formed at the large end of the head and forming cutting edges at the intersection of the concave recess and the divergent surfaces. A shank extends within the bore and is attached to the head at the small end thereof. The body defines a tooth receiving seat including a platform and an abutment surface for receiving the head. The tooth including the tooth shank and head extends in a tangential axis to the substrate with the large end of the tooth head projecting in the direction of movement of the saw substrate. The legs define recesses into which cupped sleeves are provided, and a bolt and nut extends through the substrate to retain the cupped sleeves against the substrate and thereby retain the tooth holder in position on the substrate.

In another aspect of the present invention, there is a saw tooth and tooth holder combination for a cutting saw, wherein the saw includes a substrate and the holder is adapted to be releasably fastened to the substrate. The holder includes a tooth receiving seat which includes a first platform surface and an abutment surface at an angle thereto formed in a body of the holder. Bore means extend in the body through the abutment surface, and at least a pair of teeth are mounted on the tooth seat in side-by-side relationship, with each tooth being identical and having a head including a small end and a large end with divergent surfaces therebetween. The small end is adapted to fit against the abutment surface, and the divergent surfaces are adapted to fit on the platform. Shank means pass through the respective bores to each head and are attached thereto. Each of the tooth heads includes a concave recess at the large end thereof and forms cutting edges at the intersections of the concave surface and the divergent surfaces, whereby each tooth is capable of being rotated about its axis to present exposed cutting surfaces An advantage of the present construction is that the teeth and holders are mounted on the exterior of the disc. In the event that a tooth or several teeth should strike an immovable object, individual teeth and holders may be sheared from the disc or otherwise damaged, without transmitting damaging loads to the saw disc, and thus the remainder of the circular saw remains usable. The damaged teeth and holders can be replaced. Furthermore, it is contemplated to rotate the teeth in the holders in order to spread the wear and increase the life of such teeth.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary side elevation of a detail of the present invention;

FIG. 2 is a vertical cross-section taken along line 2—2 of FIG. 1;

FIG. 3 is a top plan view of another embodiment of the present invention;

FIG. 4 is a vertical cross-section taken along line 4—4 of FIG. 3;

FIG. 5 is an end elevation of a detail of the embodiment shown in FIG. 3; and

FIG. 6 is an end elevation, similar to FIG. 5, but showing a further embodiment of the present invention.

DESCRIPTION OF THE PREFERRED EMBODIMENTS

Referring now to the drawings, there is illustrated a fragment of a circular saw 10. A tooth assembly 12 is illustrated which includes a tooth 14 and a holder 16 adapted to be mounted on the disc 18.

Referring to FIGS. 1 and 2, the tooth assembly 12 includes a tooth head 22 which has a square frusto-pyramidal shape having a cutting face defining cutting tips 24a and 24b. The tooth head of the present embodiment is similar to that described in U.S. Pat. No. 4,932,447, granted to Armand J. Morin on June 12, 1990, and Canadian Patent 1,269,028, granted May 15, 1990.

The tooth head 22 has a concave recess 28 defining cutting edges 26. These cutting edges are defined at the intersection of the concave recess and the divergent side surfaces 25. The shank is in the form of a bolt 20 having a bolt head 21 and is adapted to pass through the bore 40 defined in the body 38 of the holder 16. The bolt threadably engages a collar 23 extending from head 22.

The holder is in the form of a clevis and includes a pair of legs 32 and 34 saddled on either side of the disc 18 and two sets of stepped recesses 33a and 35a and 33b and 35b. Each set of stepped recesses, for instance, recesses 33b and 35b, as shown in FIG. 2, receive cups 46b and 48b. A nut and bolt arrangement 50a and 52a as well as 50b and 52b are provided to retain the cups on the disc 18 along with the legs 32 and 34 and, therefore, the holder 16 to the disc 18.

As can be seen from the construction of the holder 16, shoulders 39 are provided to which the small end of the tooth head 22 will fit snugly. The loads transmitted through the tooth head 22 will be completely absorbed by the body 38 of the holder 16. A flat sloped surface 41 receives one of the pyramidal side walls 25 of the tooth head 22. When the tooth head is snugly seated in the holder 22, the surface 41 will prevent the tooth 14 from rotating on its axis.

The mounting of the tooth 14 is such that the axis of the shank 20 and the tooth head 22 is tangential to the saw disc 18. It is understood that if the tooth head 22 were to strike an immovable object, such as a large boulder, the fastener represented by bolt 50 and nut 52 and the sleeves 46 and 48 might shear, allowing the tooth holder 16 and the tooth 14 to be blown away from the disc 18 before causing any damage to the remainder of the saw including the disc 18. Under normal operating circumstances, the impact received by the tooth head 22 will be absorbed by the tooth holder 16. If the tooth head 22 is damaged, it is merely replaced by removing the spring pin 54, etc.

In another embodiment as shown in FIGS. 3 to 6, like numerals have been raised by 100. As shown in FIGS. 3 to 5, for instance, a pair of teeth 114a and 114b are mounted side by side with adjacent edges 126 in contact with each other.

The holder 116 is offset, as shown in FIGS. 3 and 5, such that the tooth 114b is generally in the plane of the disc 118 and the tooth 114a is offset from the disc 118. The teeth 114a and 114b are identical to the tooth in FIG. 1 and, in fact, concave recesses 128 are apparent from FIGS. 3 to 5 with the tips 124.

The teeth 114a and 114b can be made smaller than tooth 14 of FIG. 1, and thus may be cast individually at a much lower cost than the machining required to make a larger tooth out of stellite, for instance.

Each of the tooth heads 122 has a surface 125 sitting on the platform 130 of the holder 116. The holder 116 also has an abutment surface 131 against which the tooth heads 122 abut when they are mounted on the holder by means of the bolts 120. When two teeth 114a and 114b are mounted on the holder 116, they can be individually rotated to present other tips 124 when the exposed tips have been worn through use. The provision of an offset holder along with the double teeth also provides a wider kerf coincident with the support plate on a feller buncher (not shown), such that the freshly sawed trunk of the tree can easily slide onto the support plate. The offset portion of the holder 116 coincides with the thickness of the support plate generally.

In another embodiment as shown in FIG. 6, a frusto-conical tooth head 222 replaces the frusto-pyramidal teeth 114a and 114b.

I claim:

1. A saw tooth and tooth holder combination for a cutting saw, wherein the saw includes a substrate and the holder is adapted to be releasably fastened to the substrate, the holder including a tooth receiving seat which includes a first platform surface and an abutment surface at an angle thereto formed in a body of the holder, bore means extending in the body through the abutment surface, and a pair of teeth mounted on the tooth seat in side-by-side relationship, with each tooth being identical and having a head including a small end and a large end with divergent surfaces therebetween, the small end being adapted to fit against the abutment surface and divergent surfaces adapted to fit on the platform; shank means passing through the bore means to each head and attached thereto, each of the tooth heads including a concave recess at the large end thereof and forming cutting edges at the intersections of the concave recess and the divergent surfaces, whereby each tooth is capable of being rotated about its axis to present exposed cutting surfaces.

2. A saw tooth and tooth holder combination as defined in claim 1, wherein each tooth has a frusto-pyramidal shape, and adjacent cutting edges of each tooth are in contact forming a median linear projection.

3. A saw tooth and tooth holder combination as defined in claim 1, wherein each tooth in the pair of teeth is in the form of a frusto-conical head with at least a point on the cutting edge being in contact with a point of the cutting edge of the other tooth in the pair.

4. A saw tooth and tooth holder combination as defined in claim 3, wherein the substrate is in the form of a circular disc, and the holder is mounted on the periphery of the disc and is offset such that one tooth in the pair has a longitudinal axis in the plane of the disc and the other tooth in the pair is offset from the plane of the disc.

5. A saw tooth and tooth holder combination as defined in claim 1, wherein each tooth head is in the form of a square frusto-pyramid with four cutting tips and a spherical recess extending therebetween and defining concave cutting edges between the cutting tips.

* * * * *